United States Patent
Sakamoto (10) Patent No.: US 8,009,935 B2
(45) Date of Patent: Aug. 30, 2011

(54) PIXEL INTERPOLATION CIRCUIT, PIXEL INTERPOLATION METHOD, AND RECORDING MEDIUM

(75) Inventor: Shohei Sakamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 618 days.

(21) Appl. No.: 12/178,790

(22) Filed: Jul. 24, 2008

(65) Prior Publication Data

US 2009/0034878 A1  Feb. 5, 2009

(30) Foreign Application Priority Data

Jul. 30, 2007 (JP) ................................ 2007-197117
May 30, 2008 (JP) ................................ 2008-141945

(51) Int. Cl.
*G06K 9/32* (2006.01)
(52) U.S. Cl. ...................................... 382/300
(58) Field of Classification Search .................. None
See application file for complete search history.

(56) References Cited

U.S. PATENT DOCUMENTS

| | | | |
|---|---|---|---|
| 7,157,796 | B2 | 1/2007 | Yamagata |
| 7,256,496 | B2 | 8/2007 | Okada et al. |
| 7,462,511 | B2 | 12/2008 | Yamagata |
| 2006/0050956 | A1 | 3/2006 | Tanaka |

FOREIGN PATENT DOCUMENTS

| | | |
|---|---|---|
| JP | 2000-69492 A | 3/2000 |
| JP | 2000-175208 A | 6/2000 |
| JP | 2000-278703 A | 10/2000 |
| JP | 2001-354852 A | 12/2001 |
| JP | 2004-229055 A | 8/2004 |
| JP | 2005-159957 A | 6/2005 |
| JP | 2005-175317 A | 6/2005 |
| JP | 2005-347461 A | 12/2005 |
| JP | 2006-080897 A | 3/2006 |
| JP | 2006-135564 A | 5/2006 |
| JP | 2007-161784 A | 6/2007 |

OTHER PUBLICATIONS

Japanese Office Action dated Feb. 8, 2011 (and English translation thereof) in counterpart Japanese Application No. 2008-224342.
Korean Office Action dated Mar. 2, 2010 and English translation thereof issued in counterpart Korean Application No. 10-2008-0071433.
Japanese Office Action dated Jun. 23, 2009 and English translation thereof issued in a counterpart Japanese Application No. 2008-141945.

*Primary Examiner* — Daniel G Mariam
*Assistant Examiner* — Elisa M Rice
(74) *Attorney, Agent, or Firm* — Holtz, Holtz, Goodman & Chick, PC (57) ABSTRACT

A correlation along a horizontal direction and a correlation along a vertical direction are calculated with respect to a neighboring region around an interpolation target pixel by using respective pixel values of R pixels, G pixels, and B pixels in Bayer data. The pixel value of the G pixel to be interpolated for the interpolation target pixel is determined based upon pixel values of pixels adjacent to the interpolation target pixel along a direction exhibiting a stronger correlation between the calculated correlations. The interpolation target pixel in the Bayer data is interpolated by using the G pixel of the pixel value determined.

8 Claims, 7 Drawing Sheets

| B0 | G1 | B2 | G3 | B4 | G5 | B6 |
|---|---|---|---|---|---|---|
| G7 | R8 | G9 | R10 | G11 | R12 | G13 |
| B14 | G15 | B16 | G17 | B18 | G19 | B20 |
| G21 | R22 | G23 | R24 | G25 | R26 | G27 |
| B28 | G29 | B30 | G31 | B32 | G33 | B34 |
| G35 | R36 | G37 | R38 | G39 | R40 | G41 |
| B42 | G43 | B44 | G45 | B46 | G47 | B48 |

PIXEL INTERPOLATION CIRCUIT, PIXEL INTERPOLATION METHOD, AND RECORDING MEDIUM

This application is based on and claims the benefit of priority from Japanese Patent Application Nos. 2007-197117 and 2008-141945, respectively filed on 30 Jul. 2007 and 30 May 2008, the content of which is incorporated herein by reference.

BACKGROUND OF THE INVENTION

1. Field of the Invention

The present invention relates to a pixel interpolation circuit, a pixel interpolation method, and a recording medium, used in an imaging system etc., employing a single-panel color imaging system.

2. Related Art

It has become standard for digital cameras to use a single-panel imaging system using an image acquisition device employing a Bayer array as a pixel array. When image signals are acquired based upon Bayer data, which is object image data acquired by an image acquisition device that employs a Bayer array, color information (pixel values) for each pixel, other than that of the color filter arranged at the respective pixels in the image acquisition device that employs a Bayer array has to be interpolated. In particular, G pixel information affects brightness information. Accordingly, the G pixel information affects the image signal resolution and the contour sharpness.

As conventional techniques for interpolating a G pixel for each of the interpolation target pixels in the Bayer data (R pixels and B pixels having no G pixel information), the techniques described in Unexamined Japanese Patent Application No. 2000-278703 and Unexamined Japanese Patent Application No. 2006-135564 are known. In these conventional techniques, G pixel interpolation is performed for each interpolation target pixel, giving consideration to the correlation among the pixels around the interpolation target pixels in the Bayer data.

However, these conventional techniques refer to only G pixels around the interpolation target pixel when G pixels are interpolated. This leads to a small amount of pixel information being used as reference pixel for interpolating the G pixel for each interpolation target pixel.

SUMMARY OF THE INVENTION

An embodiment according the present invention comprises: a correlation calculation unit which calculates correlation in a horizontal direction and correlation in a vertical direction with respect to a neighboring region around an interpolation target pixel in the Bayer data, which is a pixel having no G pixel, by using the R pixels, G pixels, and B pixels; and a pixel value determination unit which determines the pixel value of the G pixel to be interpolated for the interpolation target pixel, based upon the pixel values of pixels adjacent to the interpolation target pixel along a direction exhibiting the stronger correlation between the correlations calculated by the correlation calculation unit. With such an embodiment, the G pixel of the pixel value determined by the pixel value determination unit is interpolated of an image signal based upon the Bayer data.

Another embodiment according the present invention comprises: a first step of calculating correlation in a horizontal direction and correlation in a vertical direction with respect to a neighboring region around an interpolation target pixel having no G pixel, by using the R pixels, G pixels, and B pixels in the Bayer data; a second step of determining the pixel value of the G pixel to be interpolated for the interpolation target pixel, based upon the pixel values of pixels adjacent to the interpolation target pixel along a direction exhibiting the stronger correlation between the correlations calculated in the first step; and a third step of interpolating the G pixel of the pixel value determined in the second step for an image signal based upon the Bayer data.

DETAILED DESCRIPTION OF THE INVENTION

A description will be made regarding the embodiment of the present invention. First, referring to FIG. 1, a description will be made regarding an overall configuration of a digital camera 100 according to this embodiment.

Figure 1:
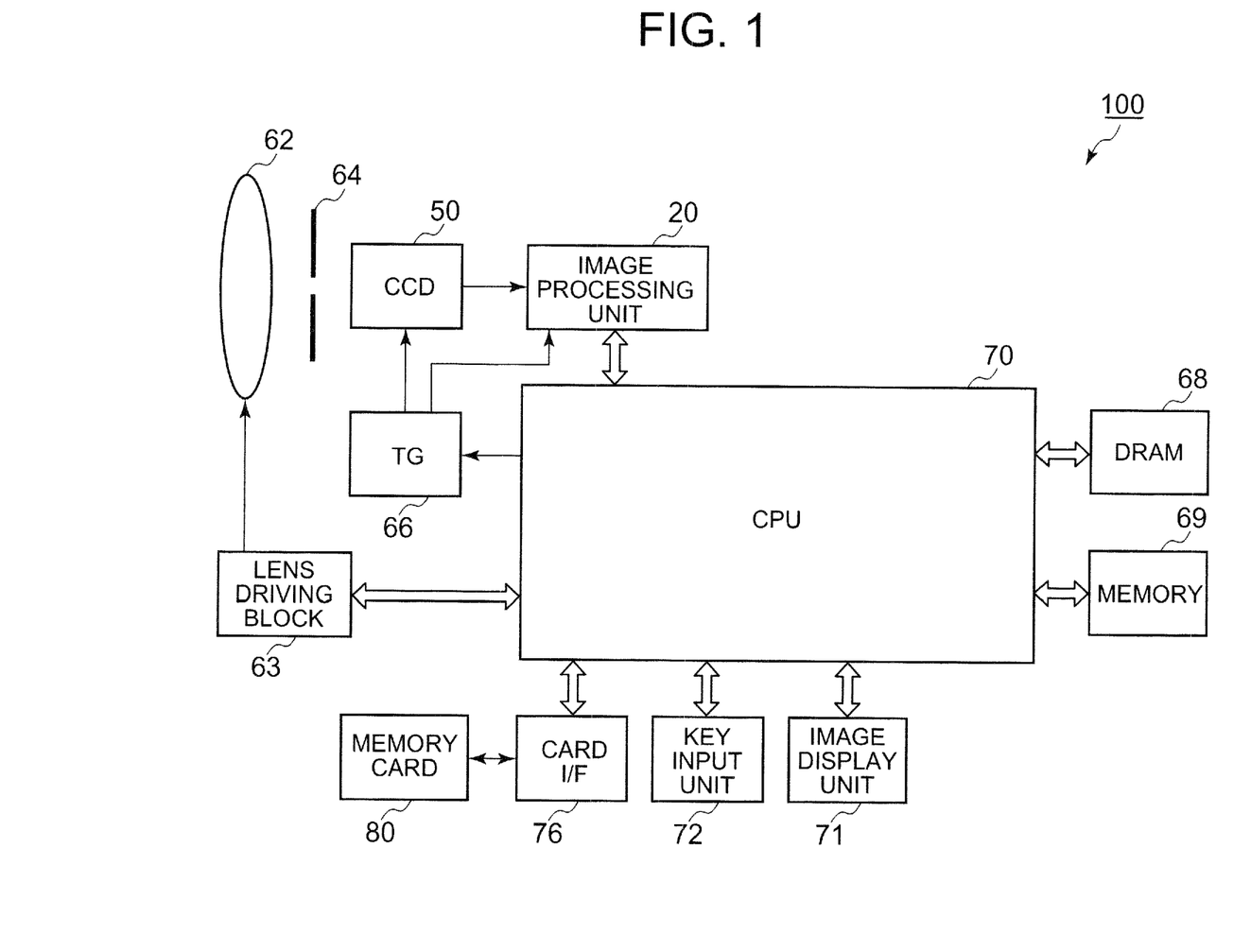
FIG. 1 is a diagram which shows the overall configuration of a digital camera 100.

An imaging lens 62 includes a focus lens and a zoom lens, and is connected to a lens driving block 63. The lens driving block 63 comprises: a focus motor and a zoom motor which respectively drive the focus lens (not shown) and the zoom lens (not shown) in the optical axial direction parallel to the image acquisition plane; a focus driver and a zoom motor driver which respectively drive the focus motor and the zoom motor according to a control signal from a CPU 70.

A diaphragm shutter 64 has an driving circuit (not shown). The driving circuit drives the diaphragm shutter according to a control signal transmitted from the CPU 70. It should be noted that the diaphragm shutter 64 has functions of both a diaphragm and a shutter.

A CCD 50, which is an image acquisition device, includes a Bayer array color filter on the photoreceptive surface thereof. The CCD 50 converts the light from the subject projected through the imaging lens 62 and the diaphragm shutter 64 into an electric signal, and outputs the electric signal converted as an imaging signal to an image processing unit 20. Furthermore, the CCD 50 performs driving operations according to a timing signal at a predetermined frequency generated by a TG 66 according to a control signal received from the CPU 70.

A memory card 80 is detachably connected to a card I/F 76.

Memory 69 stores a program and data necessary for the CPU 70 to control each component of the digital camera 100.

After an image is acquired by means of the CCD 50, DRAM 68 is used as buffer memory which temporarily stores image data transmitted to the CPU 70. Also, the DRAM 68 is used as working memory for the CPU 70.

An image display unit 71 comprises a liquid crystal display and a driving circuit thereof. When the digital camera 100 stands in standby mode for taking an image, a subject image acquired by the CCD 50 is displayed on the liquid crystal display as a through image. When the digital camera 100 plays back an image, the image display unit 71 displays an image read from the memory card 80 on the liquid crystal display.

A key input unit 72 includes multiple operation keys such as a shutter button, a mode key, a set key, a cross key and an image mode selection key, and outputs operation signals to the CPU 70 according to the user's operation of the keys.

The CPU 70 controls the overall operation of the digital camera 100. The CPU 70 executes various kinds of operations in cooperation with the program read out from the memory 69.

Figure 2:
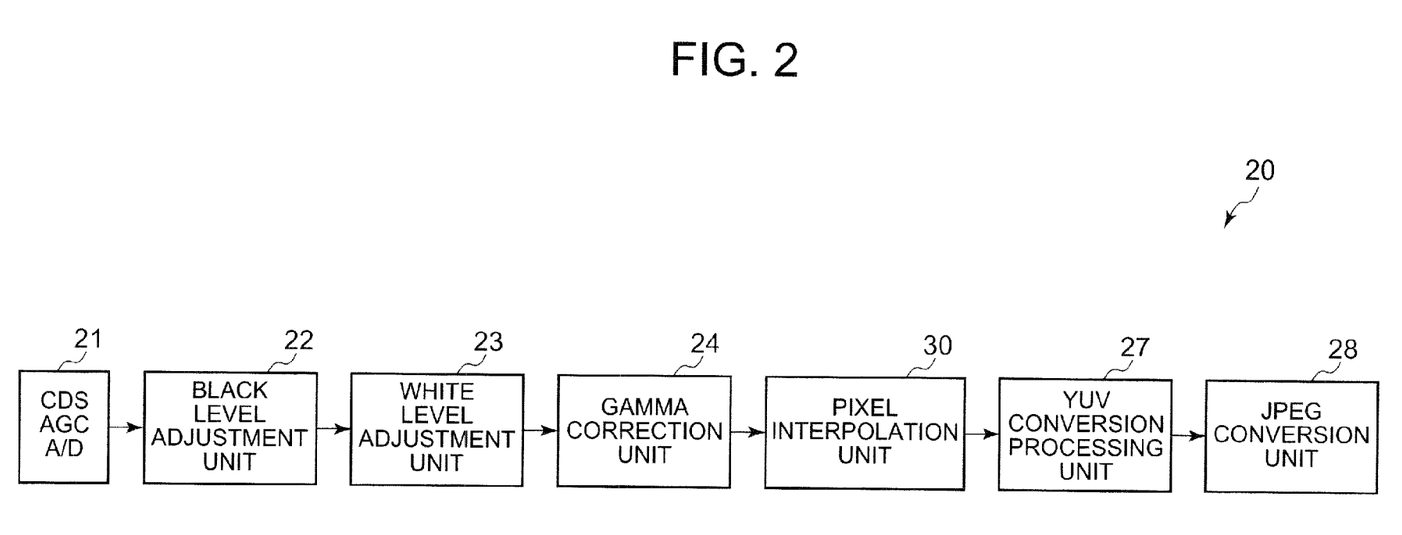
FIG. 2 is a diagram which shows the configuration of an image processing unit 20.

Next, referring to FIG. 2, a description will be made regarding configuration of the image processing unit 20. The image processing unit 20 comprises analog processing units (CDS, AGC, A/D) 21, a black level adjustment unit 22, a white balance adjustment unit 23, a gamma correction unit 24, a pixel interpolation unit 30, a YUV conversion processing unit 27, and a JPEG conversion unit 28.

In the image processing unit 20, the correlated dual sampling circuit (CDS) reduces the noise included in the imaging signal output from the CCD 50 in the form of an analog signal. The automatic gain control circuit (AGC) adjusts gain of the imaging signal after the noise reduction. The A/D converter (A/D) converts the imaging signal subjected to gain adjustment into a digital signal, i.e., the Bayer data which is pixel data consisting of R data (pixel data which represents red information), G data (pixel data which represents green information), and B data (pixel data which represents blue information) corresponding to the Bayer array of the color filter arrangement.

The black level adjustment unit 22 clamps the Bayer data at a predetermined black level. The white balance adjustment unit 23 performs gain adjustment for R, G, and B, with respect to the clamped Bayer data thereby executing white balance adjustment. The gamma correction unit 24 corrects a gamma characteristic (gradation characteristic) for the Bayer data after the white balance adjustment. The pixel interpolation unit 30 interpolates the pixel value information for the Bayer data after the gamma characteristic correction, thereby creating an image signal. A detailed description will be made later regarding the pixel interpolation unit 30.

The YUV conversion processing unit 27 creates an image signal consisting of a luminance signal (Y) and color difference signals (U, V) based upon the image signal for which pixel information is interpolated. The JPEG conversion unit 28 compresses the image signal to be coded in JPEG format. The image signal subjected to compression coding is stored in the memory card 80.

Figure 3:
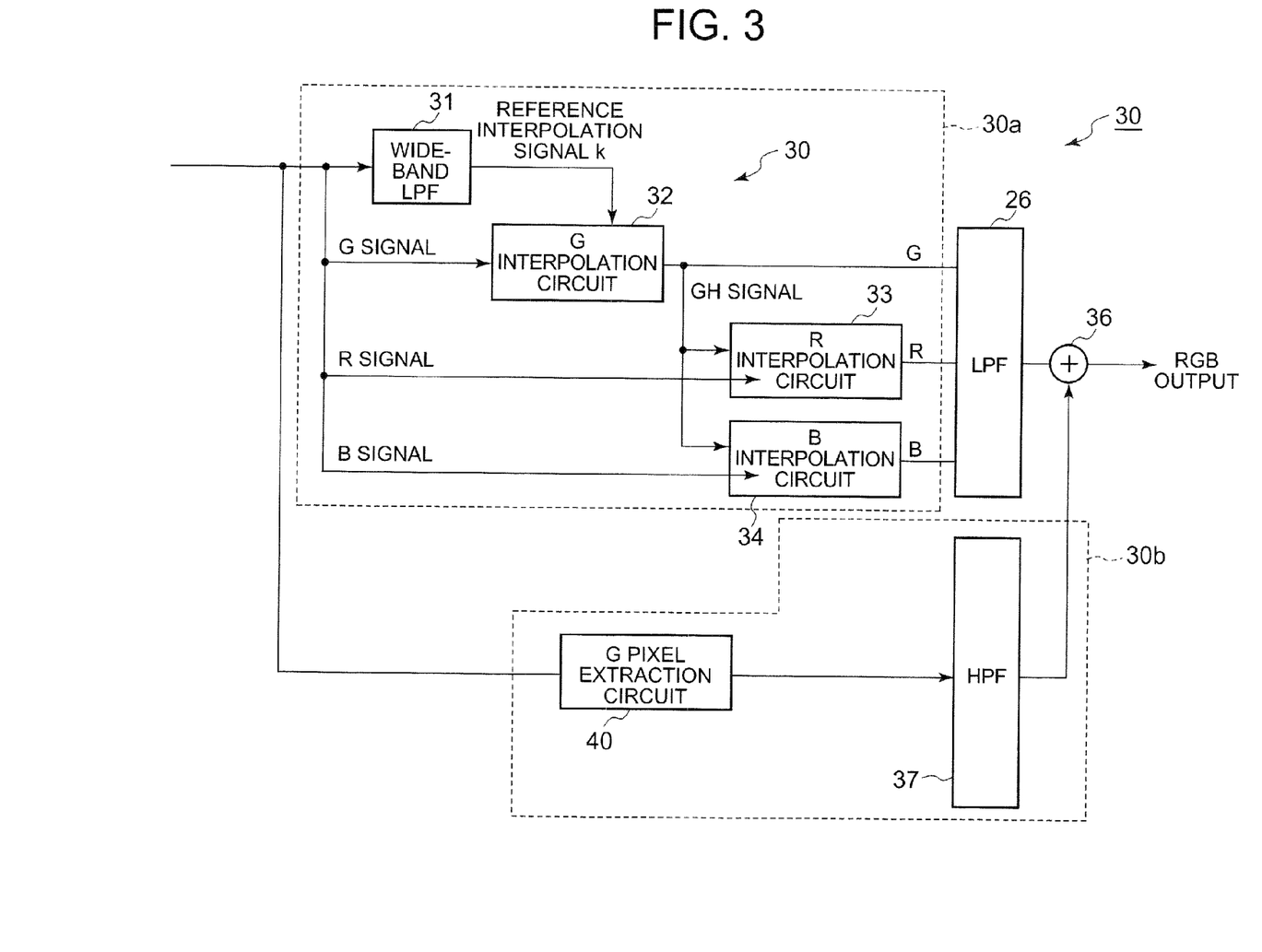
FIG. 3 is a diagram which shows a configuration of a pixel interpolation unit 30.

Next, a detailed description will be made regarding the pixel interpolation unit 30 with reference to FIG. 3. The pixel interpolation unit 30 comprises two circuit units, i.e., a first circuit unit 30a and a second circuit unit 30b, an LPF (low pass filter) 26, and an adder 36. The first circuit unit 30a comprises a wide-band LPF 31, a G interpolation circuit 32, an R interpolation circuit 33, and a B interpolation circuit 34. The second circuit unit 30b comprises a G pixel extraction circuit 40, and an HPF (high-pass filter) 37.

In the first circuit unit 30a, a signal process for interpolating the missing pixel information is performed on the Bayer data transmitted from the gamma correction unit 24, thereby creating a color image signal to be a reference image signal created in the image interpolation unit 30 creates an image signal.

Here, the first circuit unit 30a performs the same signal process as disclosed in Unexamined Japanese Patent Application No. 2006-135564. That is to say, in the signal process performed by the first circuit unit 30a, when the first circuit unit 30a interpolates the pixel values of the G pixel for a pixel that is missing a G pixel value, such as an R pixel and a B pixel (hereinafter referred to as "interpolation target pixel") in the Bayer data, the first circuit unit 30a refers to only the pixel values of the G pixels around each interpolation pixel. This leads to a small amount of pixel value information being used as reference pixel values for interpolating the G pixel value for each interpolation target pixel. As a result, it cannot be determined that the pixel value correlation around each interpolation target pixel, so that a suitable G pixel value may not be interpolated for such an interpolation target pixel.

In some cases, such an unsuitable G pixel becomes an isolated point. This leads to noise being generated in the image signal. In order to remove such a noise component, the image signal is passed through the LPF 26, which is a low-pass filter, thereby removing the high-frequency component (noise component etc.) in the image signal. However, passing the image signal through the LPF 26, which provides a function of reducing the noise component, also reduces the sharpness of the contours in the image signal. This leads to blurring in an image reproduced based upon the image signal.

In order to solve this problem, the second circuit unit 30b extracts additional information suitable for the G pixel from the Bayer data transmitted from the gamma correction unit 24. With such an arrangement, the adder 38 adds the extracted G pixel information to the image signal, which has been passed through the LPF 26. The G pixel information affects the sharpness of the contours in the image reproduced based upon the Bayer data. Thus, the contours in the image reproduced based upon the Bayer data is enhanced, thereby preventing from blurring in the reproduced image.

Figure 4:
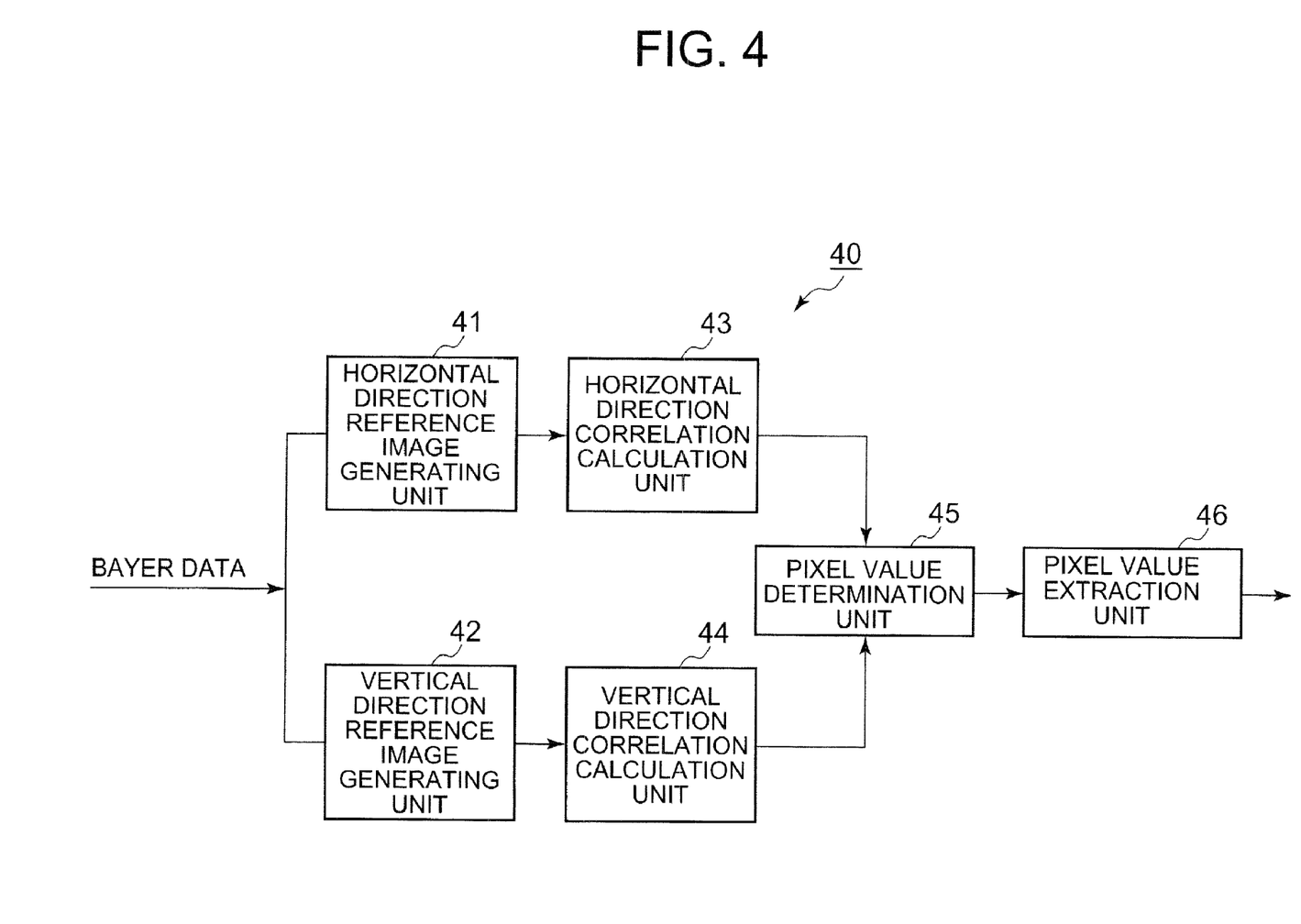
FIG. 4 is a configuration diagram which shows a G pixel extraction circuit 40.

Next, a detailed description will be made regarding the signal process performed by the second circuit unit 30b. The G pixel extraction circuit 40 included in the second circuit unit 30b is a circuit for extracting the G pixel information (pixel value) to be used in interpolation for the interpolation target pixels (R pixels and B pixels having no G pixel information) in the Bayer data. As shown in FIG. 4, the G pixel extraction circuit 40 comprises a horizontal direction reference image generating unit 41, a vertical direction reference image generating unit 42, a horizontal direction correlation calculation unit 43, a vertical direction correlation calculation unit 44, a pixel value determination unit 45, and a pixel extraction unit 46.

The horizontal direction reference image generating unit 41 performs computation for Bayer data by using the pixel values of the pixels that are adjacent along the horizontal direction so as to generate a horizontal direction reference image. The horizontal direction reference image is information to be used for determining a direction exhibiting a stronger pixel correlation around each correction target pixel in the Bayer data.

Specifically, the horizontal direction reference image generating unit 41 sequentially executes a suitable process from among the following subtraction processes (A1) through (A4) for the pixels around each interpolation target pixel in the Bayer data, thereby generating a horizontal direction reference image.

(A1) For an R pixel adjacent to a G pixel along the horizontal direction, the average value of the G pixels located adjacent to the R pixel along the horizontal direction is subtracted from the pixel value of the R pixel.

(A2) For a G pixel adjacent to an R pixel along the horizontal direction, the pixel value of the G pixel is subtracted from the average value of the R pixels located adjacent to the G pixel along the horizontal direction.

(A3) For a G pixel adjacent to a B pixel along the horizontal direction, the pixel value of the G pixel is subtracted from the average value of the B pixels located adjacent to the G pixel along the horizontal direction.

(A4) For a B pixel adjacent to a G pixel along the horizontal direction, the average value of the G pixels located adjacent to the B pixel along the horizontal direction is subtracted from the pixel value of the B pixel.

Figure 5:
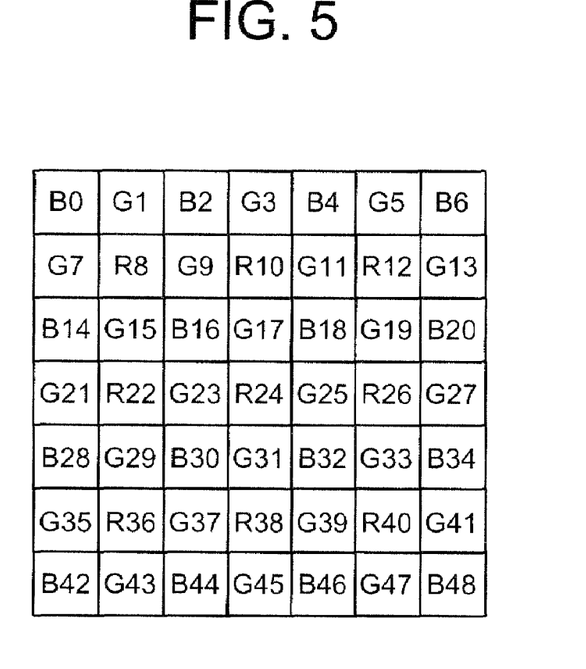
FIG. 5 is a diagram which shows an example of a Bayer array.

FIG. 5 shows an example of the pixel values of the pixels in the Bayer data. In FIG. 5, the positions denoted by the group "B" consisting of the reference symbols B0, B2, ..., B48, etc. represents the position of a B pixel in the Bayer data. Each of the positions denoted by the group "G" consisting of the reference symbols G1, G3, ..., G47, etc. represents the position of a G pixel in the Bayer data. Each of the positions denoted by the group "R" consisting of the reference symbols R8, R10, ..., R40, etc. represents the position of an R pixel in the Bayer data.

Also, in FIG. 5, each of the reference symbols B0, B2, ..., B48, etc., represents the pixel value of the corresponding B pixel. Each of the reference symbols G1, G3, ..., G47, etc., represents the pixel value of the corresponding G pixel. Each of the reference numerals R8, R10, ..., R40, etc., represents the pixel value of the corresponding R pixel.

Figure 6:
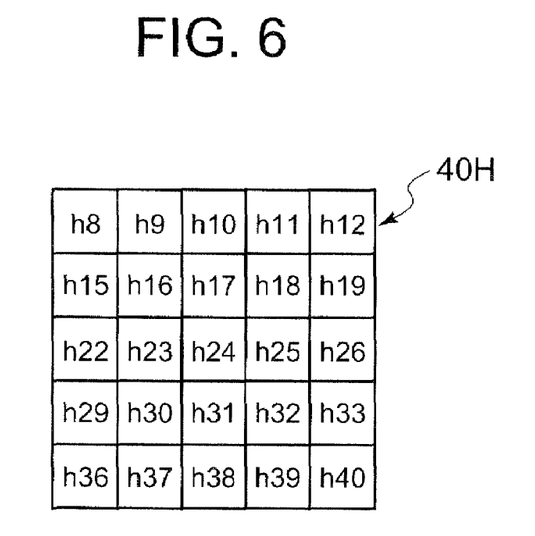
FIG. 6 is a diagram which shows an example of a horizontal reference image.

Before the horizontal direction reference image is generated, the neighboring region around each interpolation target pixel is set to the region of interest in the Bayer data. FIG. 6 shows a horizontal direction reference image 40H which is an example of the horizontal direction reference image. The horizontal direction reference image 40H is a horizontal direction reference image for the pixel (interpolation target pixel) at the position denoted by "R24" in FIG. 5.

For example, before the horizontal direction reference image 40H is generated, the neighboring region around the pixel at the position denoted by "R24" shown in FIG. 5, in which a 7×7 pixels consists of the pixels at the positions B0, G1, B2, ..., B48, is set to the region of interest. The neighboring region set to the region of interest may not consist of such 7×7 pixels.

Next, as an example of the components of the horizontal direction reference image, a description will be made regarding components of the horizontal direction reference image 40H. The component "h8" of the horizontal direction reference image 40H is calculated as follows, by performing the process (A1) using the pixel values G7, R8, and G9 shown in FIG. 5.

$$h8 = R8 - (G7+G9)/2$$

The component "h9" of the horizontal direction reference image 40H is calculated as follows, by performing the process (A2) using the pixel values R8, G9, and R10 shown in FIG. 5.

$$h9 = (R8+R10)/2 - G9$$

The component "h15" of the horizontal direction reference image 40H is calculated as follows, by performing the process (A3) using the pixel values B14, G15, and B16 shown in FIG. 5.

$$h15 = (B14+B16)/2 - G15$$

The component "h16" of the horizontal direction reference image 40H is calculated as follows, by performing the process (A4) using the pixel values G15, B16, and G17 shown in FIG. 5.

$$h16 = B16 - (G15+G17)$$

In the same way, the other components of the horizontal direction reference image 40H can be obtained by executing the processes (A1) through (A4).

Instead of the processes (A1) through (A4), a suitable process from among the following subtraction processes (A5) through (A8) may be sequentially executed for the pixels in the neighboring pixel region around each interpolation target pixel in the Bayer data, thereby generating a horizontal direction reference image.

(A5) For an R pixel adjacent to a G pixel along the horizontal direction, the pixel value of the R pixel is subtracted from the average value of the G pixels located adjacent to the R pixel along the horizontal direction.

(A6) For a G pixel adjacent to an R pixel along the horizontal direction, the average value of the R pixels located adjacent to the G pixel along the horizontal direction is subtracted from the pixel value of the G pixel.

(A7) For a G pixel adjacent to a B pixel along the horizontal direction, the average value of the B pixels located adjacent to the G pixel along the horizontal direction is subtracted from the pixel value of the G pixel.

(A8) For a B pixel adjacent to a G pixel along the horizontal direction, the pixel value of the B pixel is subtracted from the average value of the G pixels located adjacent to the B pixel along the horizontal direction.

Furthermore, the vertical direction reference image generating unit 42 performs computation for the Bayer data, by using the pixel values of the pixels that are adjacent along the vertical direction so as to generate a vertical direction reference image. The vertical direction reference image is information to be used for determining a direction exhibiting a stronger pixel correlation around each correction target pixel in the Bayer data. Specifically, the vertical direction reference image generating unit 42 sequentially executes a suitable process from among the following processes (B1) through (B4) for the pixels around each interpolation target pixel in the Bayer data, thereby generating a vertical direction reference image.

(B1) For an R pixel adjacent to a G pixel along the vertical direction, the average value of the G pixels located adjacent to the R pixel along the vertical direction is subtracted from the pixel value of the R pixel.

(B2) For a G pixel adjacent to an R pixel along the vertical direction, the pixel value of the G pixel is subtracted from the average value of the R pixels located adjacent to the G pixel along the vertical direction.

(B3) For a G pixel adjacent to a B pixel along the vertical direction, the pixel value of the G pixel is subtracted from the average value of the B pixels located adjacent to the G pixel along the vertical direction.

(B4) For a B pixel adjacent to a G pixel along the vertical direction, the average value of the G pixels located adjacent to the B pixel along the vertical direction is subtracted from the pixel value of the B pixel.

Figure 7:
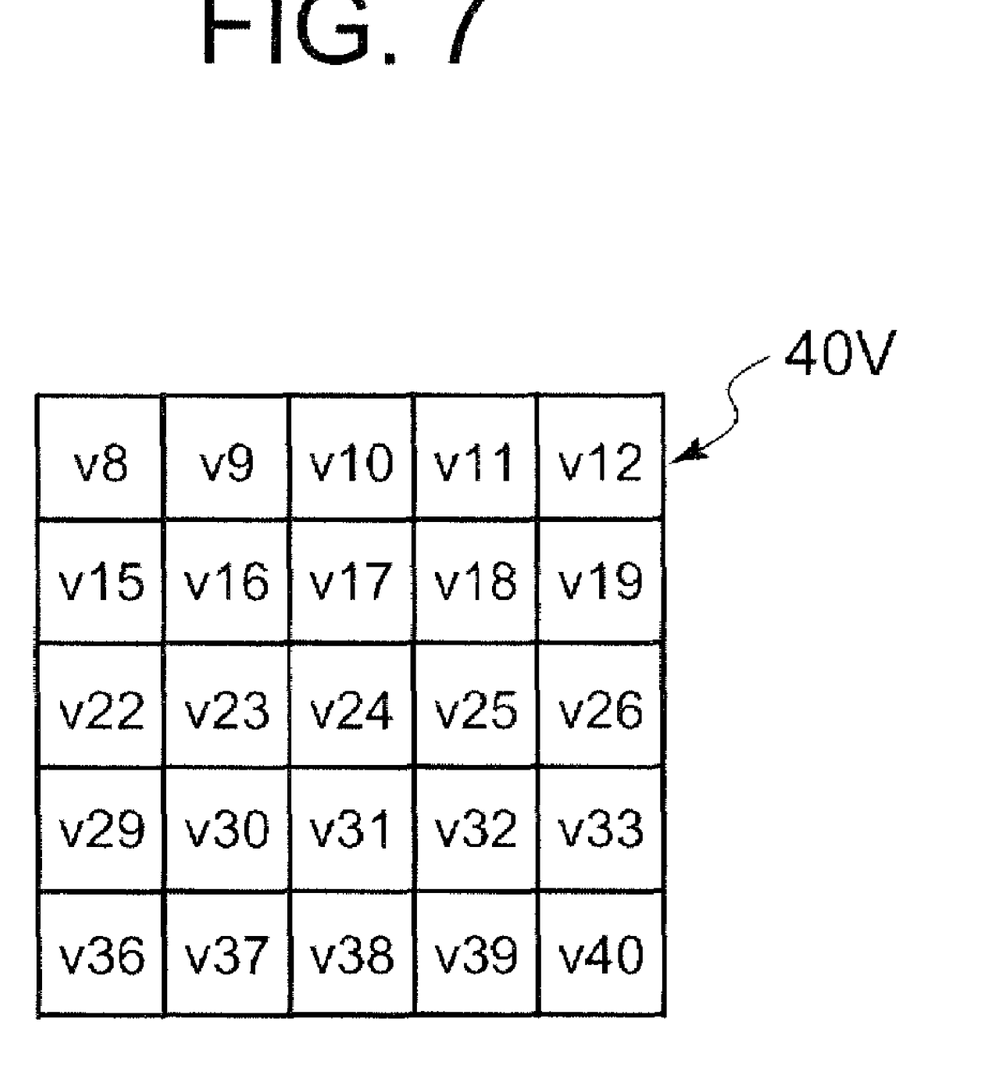
FIG. 7 is a diagram which shows an example of a vertical reference image.

FIG. 7 shows a vertical direction reference image 40V as an example of a vertical direction reference image. Description will now be made regarding the components of the vertical direction reference image 40V. The component "v8" of the vertical direction reference image 40V is calculated as follows, by performing the process (B1) using the pixel values G1, R8, and G15 shown in FIG. 5.

$$v8 = R8 - (G1+G15)/2$$

The component "v15" of the vertical direction reference image 40V is calculated as follows, by performing the process (B2) using the pixel values R8, G15, and R22 shown in FIG. 5.

$$v15=(R8+R22)/2-G15$$

The component "v9" of the vertical direction reference image 40V is calculated as follows, by performing the process (B3) using the pixel values B2, G9, and B16 shown in FIG. 5.

$$v9=(B2+B16)/2-G9$$

The component "v16" of the vertical direction reference image 40V is calculated as follows, by performing the process (B4) using the pixel values G9, B16, and G23 shown in FIG. 5.

$$v16=B16-(G9+G23)/2$$

In the same way, the other components of the vertical direction reference image 40V can be obtained by executing the processes (B1) through (B4).

Instead of the processes (B1) through (B4), a suitable process from among the following subtraction processes (B5) through (B8) may be sequentially executed for each pixel in the neighboring pixel region around the interpolation target pixel in the Bayer data, thereby generating a vertical direction reference image.

(B5) For an R pixel adjacent to a G pixel along the vertical direction, the pixel value of the R pixel is subtracted from the average value of the G pixels located adjacent to the R pixel along the vertical direction.

(B6) For a G pixel adjacent to an R pixel along the vertical direction, the average value of the R pixels located adjacent to the G pixel along the vertical direction is subtracted from the pixel value of the G pixel.

(B7) For a G pixel adjacent to a B pixel along the vertical direction, the average value of the B pixels located adjacent to the G pixel along the vertical direction is subtracted from the pixel value of the G pixel.

(B8) For a B pixel adjacent to a G pixel along the vertical direction, the pixel value of the B pixel is subtracted from the average value of the G pixels located adjacent to the B pixel along the vertical direction.

The horizontal direction correlation calculation unit 43 calculates the horizontal correlation index Hr, which is a correlation index of the horizontal direction from the horizontal direction reference image for each of the interpolation target pixels in the Bayer data. The horizontal direction correlation calculation unit 43 executes the following processes (C1) through (C3), thereby calculating the horizontal correlation index Hr.

(C1) Subtractions are calculated between the components in the horizontal direction reference image.

(C2) Absolute values are calculated for each of the subtractions obtained in (C1).

(C3) Each of the absolute values obtained in (C2) is multiplied by a predetermined value. Then, the sum total of these values obtained is calculated, thereby obtaining the horizontal correlation index Hr.

As an example of the processes shown in (C1) through (C3), the horizontal correlation index Hr for the pixel at the position denoted by "R24" shown in FIG. 5 is calculated as follows.

$$Hr=\text{abs}(h8-h9)+2\times\text{abs}(h9-h10)+2\times\text{abs}(h10-h11)+\\ \text{abs}(h11-h12)+2\times\{\text{abs}(h15-h16)+2\times\text{abs}(h16-\\ h17)+2\times\text{abs}(h17-h18)+\text{abs}(h18-h19)\}+2\times\{\text{abs}\\ (h22-h23)+2\times\text{abs}(h23-h24)+2\times\text{abs}(h24-h25)+\\ \text{abs}(h25-h26)\}+2\times\{\text{abs}(h29-h30)+2\times\text{abs}(h30-\\ h31)+2\times\text{abs}(h31-h32)+\text{abs}(h32-h33)\}+\text{abs}(h36-\\ h37)+2\times\text{abs}(h37-h38)+2\times\text{abs}(h38-h39)+\text{abs}\\ (h39-h40)$$

Here, "abs( )" represents an operation for calculating an absolute value.

The smaller the value of the horizontal correlation index Hr is, the greater the correlation in the horizontal direction is.

The vertical direction correlation calculation unit 44 calculates the vertical correlation index Vd, which is a correlation index of the vertical direction from the vertical direction reference image for each of the interpolation target pixels in the Bayer data. The vertical direction correlation calculation unit 44 executes the following processes (D1) through (D3), thereby calculating the vertical correlation index Vd.

(D1) Subtractions are calculated between the components in the vertical direction reference image.

(D2) Absolute values are calculated for each of the subtractions obtained in (D1).

(D3) Each of the absolute values obtained in (D2) is multiplied by a predetermined coefficient. Then, the sum total of these values obtained is calculated, thereby obtaining the vertical correlation index Vd.

As an example of the processes shown in (D1) through (D3), the vertical correlation index Vd for the pixel at the position denoted by "R24" shown in FIG. 5 is calculated as follows.

$$Vd=\text{abs}(v8-v15)+2\times\text{abs}(v15-v22)+2\times\text{abs}(v22-v29)+\\ \text{abs}(v29-v36)+2\times\{\text{abs}(v9-v16)+2\times\text{abs}(v16-\\ v23)+2\times\text{abs}(v23-v30)+\text{abs}(v30-v37)\}+2\times\{\text{abs}\\ (v10-v17)+2\times\text{abs}(v17-v24)+2\times\text{abs}(v24-v31)+\\ \text{abs}(v31-v38)\}+2\times\{\text{abs}(v11-v18)+2\times\text{abs}(v18-\\ v25)+2\times\text{abs}(v25-v32)+\text{abs}(v32-v39)\}+\text{abs}(v12-\\ v19)+2\times\text{abs}(v19-v25)+2\times\text{abs}(v26-v33)+\text{abs}\\ (v33-v40)$$

Here, "abs( )" represents an operation for calculating an absolute value.

The smaller the value of the vertical correlation index Vd is, the greater the correlation in the vertical direction is.

Based upon the horizontal correlation index Hr and the vertical correlation index Vd, the pixel value determination unit 45 determines the pixel value of the G pixel to be interpolated for the interpolation target pixel.

In a case in which the horizontal correlation index Hr is smaller than the vertical correlation index Vd, i.e., a case in which the correlation is stronger in the horizontal direction than in the vertical direction, the pixel value determination unit 45 determines that the average value of the pixel values of the G pixels adjacent to the interpolation target pixel in the horizontal direction is to be the pixel value of the G pixel to be interpolated for the interpolation target pixel.

In this case, for example, for the pixel (interpolation target pixel) at the position denoted by "R24" shown in FIG. 5, the pixel value determination unit 45 determines the following pixel value as the pixel value "G24" of the G pixel, which is to be interpolated, based upon the pixel values of the G pixels "G23" and "G25" located adjacent to the pixel at the position denoted by "R24" in the horizontal direction.

$$G24=(G23+G25)/2$$

On the other hand, in a case in which the vertical correlation index Vd is smaller than the horizontal correlation index Hr, i.e., a case in which the correlation is stronger in the vertical direction than in the horizontal direction, the pixel value determination unit 45 determines that the average value of the pixel values of the G pixels adjacent to the interpolation target pixel in the vertical direction is to be the pixel value of the G pixel to be interpolated for the interpolation target pixel.

The pixel value determination unit 45 determines the following pixel value as the pixel value "G24" of the G pixel, which is to be interpolated, in this case, for example, for the pixel (interpolation target pixel) at the position denoted by "R24" shown in FIG. 5, based upon the pixel values of the G pixels "G17" and "G31" located adjacent to the pixel at the position denoted by "R24" in the vertical direction.

$$G24=(G17+G31)/2$$

The pixel value extraction unit 46 extracts the pixel value determined by the pixel value determination unit as the pixel value of the G pixel to be interpolated for the interpolation target pixel in the Bayer data.

The G pixel extraction unit 40 performs the above-described processes for all the interpolation target pixels (R pixels and B pixels having no G pixel information) other than the pixel denoted by "R24" in the Bayer data and then extracts the pixel value of the G pixel to be interpolated for each interpolation target pixel. That is to say, the G pixel extraction unit 40 generates the horizontal direction reference image and the vertical direction reference image for each of all the interpolation target pixels in the Bayer data. Then, the G pixel extraction circuit 40 calculates the pixel value correlation in the horizontal direction and the pixel value correlation in the vertical direction based upon the components of the horizontal direction reference image and the vertical direction reference image generated so as to extract the pixel value of the G pixel to be interpolated for each interpolation target. This process provides an image signal consisting of only suitable G pixel information extracted from the Bayer data (hereinafter referred to as "G image signal").

Returning to FIG. 3, in the second circuit unit 30b, the G image signal obtained by the G pixel extraction circuit 40 is passed through the HPF 37, which is a high-pass filter, thereby removing the low frequency component of the G image signal.

Subsequently, in the adder 36, the G image signal, from which the low frequency component has been removed, is added to the color image signal which has been passed through the LPF (low-pass filter) 26 after the signal process performed by the first circuit unit 30a. That is to say, the color image signal is interpolated.

As described above, this embodiment determines the pixel value of the G pixel to be interpolated for the Bayer data with reference to the R pixels and the B pixels around each interpolation target pixel, in addition to the G pixels around the interpolation target pixel. In such a way, the amount of pixel information to be referenced is increased when the G pixels is interpolated for the Bayer data. Thus, a suitable pixel value can be interpolated for each G pixel in the image signal.

Also, according to this embodiment, the horizontal direction reference image and the vertical direction reference image are generated by using the pixel values of the G pixels, R pixels, and B pixels around each interpolation target pixel. Furthermore, the pixel value correlation is calculated for both the horizontal direction and the vertical direction by using the components of the horizontal direction reference image and the vertical direction reference image. The amount of pixel information to be referenced is increased when the correlation with respect to the pixel value is calculated. As a result, the possibility of false determination of a direction exhibiting a stronger correlation with respect to the pixel value is reduced.

Also, according to this embodiment, by using the suitable information with respect to the G pixels extracted by the second circuit unit 30b is interpolated for the color image signal that has been passed through the LPF (low-pass filter) 26 after the signal process is performed by the first circuit unit 30a. The G pixel information affects the sharpness of the contours in the reproduced image. Accordingly, the contours in the reproduced image based upon the Bayer data is enhanced, thereby improving the image quality of the reproduced image.

Modification

Next, a description will be made regarding a modification of this embodiment. In some cases, the difference between the correlation in the horizontal direction and the correlation in the vertical direction is slight with respect to the neighboring pixels around an interpolation target pixel. That is to say, in some cases, the gradation is gradual around an interpolation target pixel. In such a case, when the G pixel provided according to the process in the first embodiment is interpolated for such an interpolation target pixel in the Bayer data , the pixel value of the interpolation target pixel is set to a conspicuous value (isolated point). This leads to deteriorate image quality in the reproduced image based upon the image signal. This modification has been made in view of the aforementioned problem.

Figure 8:
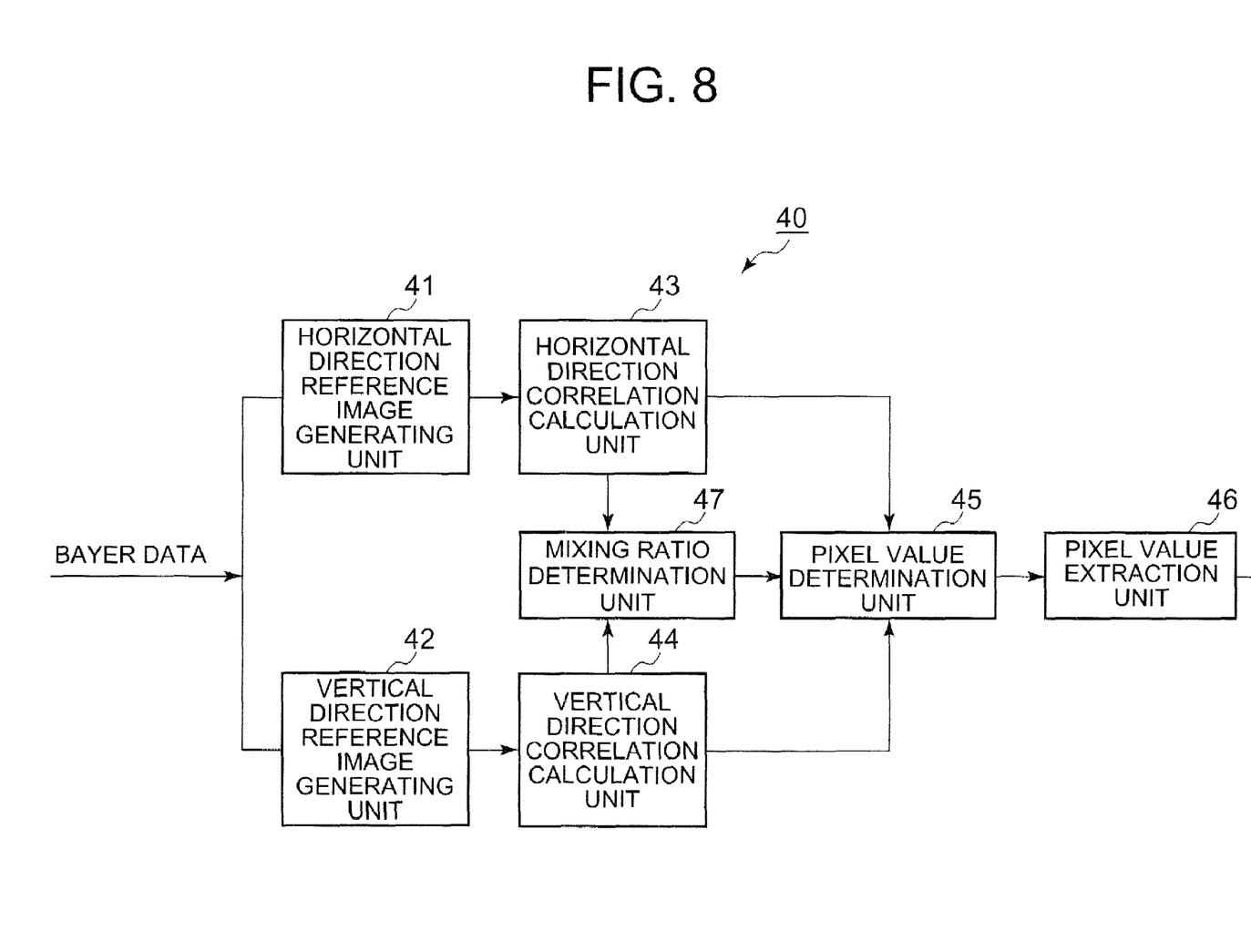
FIG. 8 is a configuration diagram which shows a G pixel extraction circuit according to a modification.

This modification is provided in a similar way of the aforementioned embodiment, except that the G pixel extraction circuit 40 according to the modification is provided with a mixing ratio determination unit 47 as shown in FIG. 8. The other components and process are the same as the above described embodiment The mixing ratio determination unit 47 determines the mixing ratio based upon the horizontal correlation index Hr calculated by horizontal direction correlation calculation unit 43 and the vertical correlation index Vd calculated by vertical direction correlation calculation unit 44.

In a case in which the horizontal correlation index Hr is smaller than the vertical correlation index Vd, i.e., correlation is stronger in the horizontal direction than in the vertical direction, the mixing ratio determination unit 47 determines the value Hr/Vd as the mixing ratio. On the other hand, in a case in which the vertical correlation index Vd is smaller than the horizontal correlation index Hr, i.e., correlation is stronger in the vertical direction than in the horizontal direction, the mixing ratio determination unit 47 determines the value Vd/Hr as the mixing ratio.

In a case in which there is a stronger correlation in the horizontal direction than in the vertical direction, the pixel value determination unit 45 calculates the average value of the pixel values of the G pixels adjacent to the interpolation target pixel along the horizontal direction, and the average value of the four G pixels adjacent to the interpolation target pixel along the horizontal direction and the vertical direction. Then, the pixel value determination unit 45 calculates the sum of these average values at a ratio based upon the mixing ratio. The pixel value determination unit 45 determines the obtained pixel value of the G pixel to be the pixel value of the G pixel interpolated for the interpolation target pixel.

In this case, for example, the pixel value of the G pixel "G24", which is a pixel value to be interpolated for the pixel at the position indicated by "R24" shown in FIG. 5, is calculated as follows.

$$G24=(1.0-(Hr/Vd))\times(G23+G25)/2+(Hr/Vd)\times(G17+G31+G23+G25)/4$$

In a case in which there is a stronger correlation in the vertical direction than in the horizontal direction, the pixel value determination unit 45 calculates the average value of the pixel values of the G pixels adjacent to the interpolation target pixel along the vertical direction, and the average value of the four G pixels adjacent to the interpolation target pixel along the horizontal the vertical directions. Then, the pixel value determination unit 45 calculates the sum of these average values at a ratio based upon the mixing ratio. The pixel value determination unit 45 determines the obtained pixel value of the G pixel to be the pixel value of the G pixel interpolated for the interpolation target pixel.

In this case, for example, the pixel value of the G pixel "G24", which is a pixel value to be interpolated for the pixel at the position indicated by "R24" shown in FIG. 5, is calculated as follows.

$$G24=(1.0-(Vd/Hr))\times(G17+G31)/2+(Vd/Hr)\times(G17+G31+G23+G25)/4$$

The pixel value extraction unit 46 extracts the pixel value determined by the pixel value determination unit as the pixel value of the G pixel to be interpolated for the interpolation target pixel in the Bayer data. Thus, an image signal (G image signal) that consists of only suitable G pixel information with respect to the G pixels extracted from the Bayer data can be obtained.

Subsequently, returning to FIG. 3, the obtained G image signal is added (i.e., interpolated) to the color image signal which has been passed through the LPF (low-pass filter) after the signal process is performed by the first circuit unit 30*a*.

With the modification as described above, in addition to the average value of the two pixels adjacent to the interpolation target pixel along the direction exhibiting a stronger correlation, the average value of the four pixels adjacent to the interpolation target pixel along the horizontal direction and the vertical direction is used for determining the pixel value of the G pixel to be interpolated for the Bayer data. In such a way, the pixel value of the interpolation target pixel is not set to a conspicuous value (isolated point), even if the difference between the correlation in the horizontal direction and the correlation in the vertical direction is slight. This prevents from deteriorating image quality in the reproduced image reproduced based upon the image signal.

The present invention is not intended to be limited to the above-described embodiment and modification. Rather, various changes in design may be made without departing from the spirit of the invention, which are also encompassed by the invention.

What is claimed is:

1. A pixel interpolation circuit comprising:
    a pixel interpolation unit which determines, by using only a pixel value of a G pixel in a neighboring region around an interpolation target pixel having no G pixel value in Bayer data, a G pixel value for the interpolation target pixel, and generates an interpolation image signal by interpolating the determined G pixel value in the interpolation target pixel;
    a correlation calculation unit which calculates correlation in a horizontal direction and correlation in a vertical direction with respect to the neighboring region around the interpolation target pixel, by performing computations between a pixel value of a given pixel that is an R pixel, a G pixel, or a B pixel, and a pixel value of a neighboring pixel in a neighboring region around the given pixel, which is different from the given pixel in color component, in the Bayer data;
    a pixel value determination unit which determines a G pixel value for the interpolation target pixel, based upon pixel values of pixels adjacent to the interpolation target pixel along one of the horizontal direction and the vertical direction that exhibits a stronger correlation between the correlations calculated by the correlation calculation unit;
    a G image signal acquisition unit which acquires a G image signal including only G pixel values determined by the pixel value determination unit;
    a high-pass filter which removes low frequency components of the G image signal acquired by the G image signal acquisition unit; and
    an adding unit which adds a G pixel value in the G image signal whose low frequency components have been removed by the high-pass filter, to the interpolation image signal generated by the pixel interpolation unit;
    wherein the pixel value determination unit determines a pixel value, which is acquired by calculating a sum of an average value of pixel values of pixels adjacent to the interpolation target pixel along the one of the horizontal direction and the vertical direction that exhibits the stronger correlation between the correlations calculated by the correlation calculation unit, and an average value of pixel values of the pixels adjacent to the interpolation target pixel along the horizontal direction and the vertical direction, according to a predetermined ratio, as the G pixel value.

2. A pixel interpolation circuit according to claim 1, further comprising:
    a first reference image generating unit which generates a first reference image by performing computations by using the pixel values of the pixels that are adjacent along the horizontal direction in the neighboring region around the interpolation target pixel; and
    a second reference image generating unit which generates a second reference image by performing computations by using the pixel values of the pixels that are adjacent along the vertical direction in the neighboring region around the interpolation target pixel;
    wherein the correlation calculation unit calculates the correlation in the horizontal direction based upon the first reference image generated by the first reference image generating unit and calculates the correlation in the vertical direction based upon the second reference image generated by the second reference image generating unit.

3. A pixel interpolation circuit according to claim 2, wherein the first reference image generating unit comprises a horizontal difference computation unit which acquires a difference value between the pixel value of a first pixel and an average value of the pixel values of a second pixel and a third pixel adjacent to the first pixel along the horizontal direction, in the neighboring region around the interpolation target pixel, and generates the first reference image based upon difference values obtained by the horizontal difference computation unit; and
    wherein the second reference image generating unit includes a vertical difference computation unit which acquires a difference value between the pixel value of the first pixel and an average value of the pixel values of a fourth pixel and a fifth pixel adjacent to the first pixel along the vertical direction, in the neighboring region around the interpolation target pixel, and generates the second reference image based upon difference values obtained by the vertical difference computation unit.

4. A pixel interpolation circuit according to claim 3, wherein the first reference image generating unit comprises:
    a first horizontal difference computation unit which acquires the difference value between the pixel value of an R pixel and the average value of the pixel values of G pixels adjacent to the R pixel along the horizontal direction;
    a second horizontal difference computation unit which acquires the difference value between the pixel value of a B pixel and the average value of the pixel values of G pixels adjacent to the B pixel along the horizontal direction;

a third horizontal difference computation unit which acquires the difference value between the average value of the pixel values of R pixels adjacent to a G pixel along the horizontal direction and the pixel value of the G pixel;

a fourth horizontal difference computation unit which acquires the difference value between the average value of the pixel values of B pixels adjacent to a G pixel along the horizontal direction and the pixel value of the G pixel;

wherein the first reference image generating unit generates the first reference image based upon the difference values obtained by the first through fourth horizontal difference computation units;

wherein the second reference image generating unit includes:

a first vertical difference computation unit which acquires the difference value between the pixel value of an R pixel and the average value of the pixel values of G pixels adjacent to the R pixel along the vertical direction;

a second vertical difference computation unit which acquires the difference value between the pixel value of a B pixel and the average value of the pixel values of G pixels adjacent to the B pixel along the vertical direction;

a third vertical difference computation unit which acquires the difference value between the average value of the pixel values of R pixels adjacent to a G pixel along the vertical direction and the pixel value of the G pixel;

a fourth vertical difference computation unit which acquires the difference value between the average value of the pixel values of B pixels adjacent to a G pixel along the vertical direction and the pixel value of the G pixel; and wherein the second reference image generating unit generates the second reference image based upon the difference values obtained by the first through fourth vertical difference computation units.

5. A pixel interpolation circuit according to claim 4, wherein the correlation calculation unit comprises:

a first calculation unit which calculates a first correlation value which is a sum total of values obtained by multiplying absolute values of the difference values obtained by the first through fourth horizontal difference computation units by respective predetermined coefficients; and a second calculation unit which calculates a second correlation value which is a sum total of values obtained by multiplying absolute values of the difference values obtained by the first through fourth vertical difference computation units by respective predetermined coefficients; and wherein the correlation calculation unit calculates the correlation in the horizontal direction based upon the first correlation value calculated by the first calculation unit and calculates the correlation in the vertical direction based upon the second correlation value calculated by the second calculation unit.

6. A pixel interpolation circuit according to claim 1, wherein the pixel value determination unit determines an average value of the pixel values of the pixels adjacent to the interpolation target pixel along the one of the horizontal direction and the vertical direction that exhibits the stronger correlation between the correlations calculated by the correlation calculation unit, as a G pixel value of another interpolation target pixel.

7. A pixel interpolation circuit according to claim 5, wherein the predetermined ratio is calculated based upon the first correlation value calculated by the first calculation unit and the second correlation value calculated by the second calculation unit.

8. A non-transitory computer-readable recording medium storing a program which is executable by a computer to cause the computer to function as elements including:

a pixel interpolation unit which determines, by using only a pixel value of a G pixel in a neighboring region around an interpolation target pixel having no G pixel value in Bayer data, a G pixel value for the interpolation target pixel, and generates an interpolation image signal by interpolating the determined G pixel value in the interpolation target pixel;

a correlation calculation unit which calculates correlation in a horizontal direction and correlation in a vertical direction with respect to the neighboring region around the interpolation target pixel, by performing computations between a pixel value of a given pixel that is an R pixel, a G pixel, or a B pixel, and a pixel value of a neighboring pixel in a neighboring region around the given pixel, which is different from the given pixel in color component, in the Bayer data;

a pixel value determination unit which determines a G pixel value for the interpolation target pixel, based upon pixel values of pixels adjacent to the interpolation target pixel along one of the horizontal direction and the vertical direction that exhibits a stronger correlation between the correlations calculated by the correlation calculation unit;

a G image signal acquisition unit which acquires a G image signal including only G pixel values determined by the pixel value determination unit;

a high-pass filter which removes low frequency components of the G image signal acquired by the G image signal acquisition unit; and an adding unit which adds a G pixel value in the G image signal whose low frequency components have been removed by the high-pass filter, to the interpolation image signal generated by the pixel interpolation unit;

wherein the pixel value determination unit determines a pixel value, which is acquired by calculating a sum of an average value of pixel values of pixels adjacent to the interpolation target pixel along the one of the horizontal direction and the vertical direction that exhibits the stronger correlation between the correlations calculated by the correlation calculation unit, and an average value of pixel values of the pixels adjacent to the interpolation target pixel along the horizontal direction and the vertical direction, according to a predetermined ratio, as the G pixel value.

* * * * *